Dec. 22, 1959 R. McFARLAND, JR 2,918,089
DIAPHRAGM ASSEMBLY
Filed Nov. 3, 1955 3 Sheets-Sheet 2
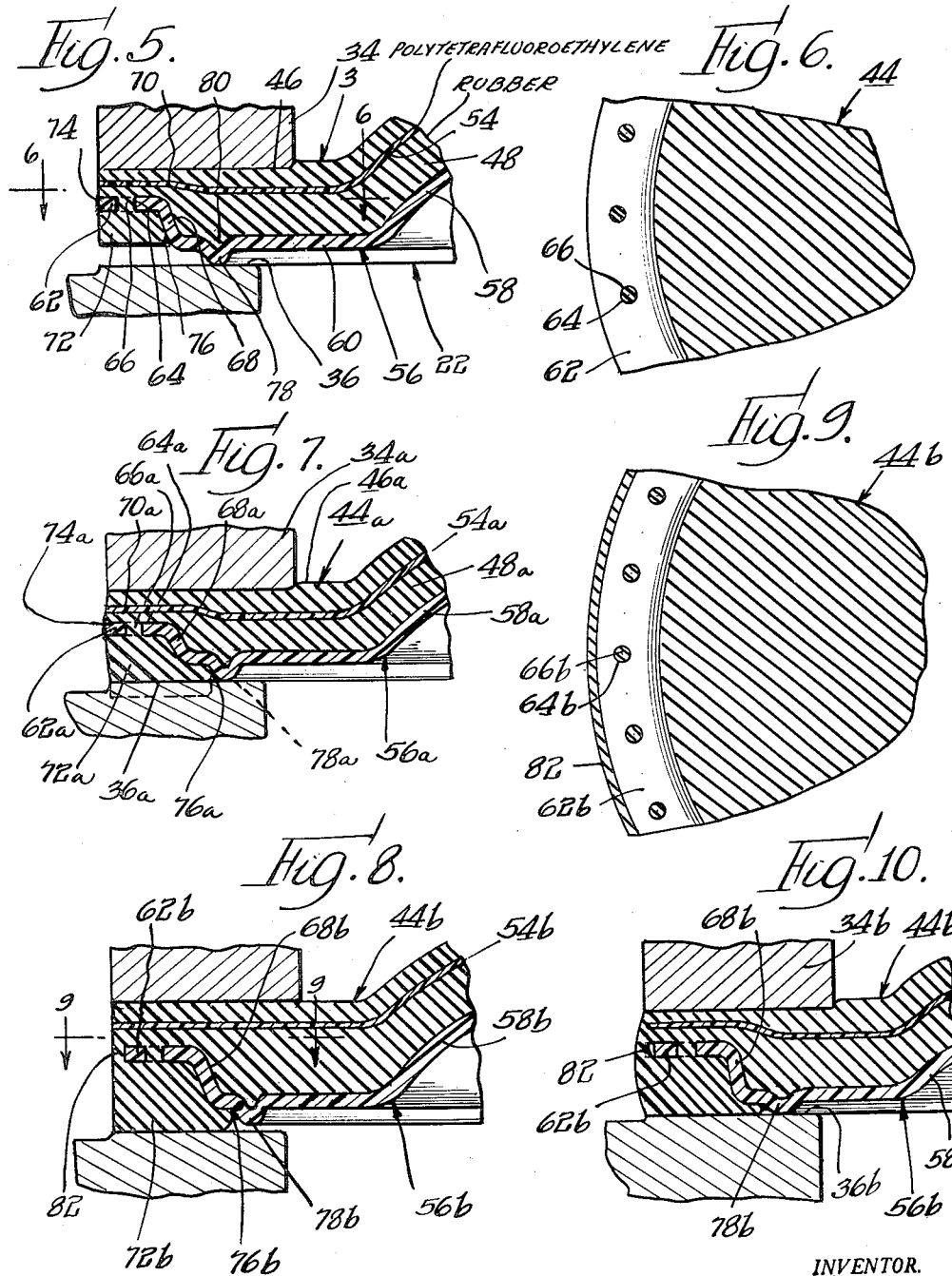
INVENTOR.
Rolland McFarland, Jr.
BY Olson & Trexler
Attys.

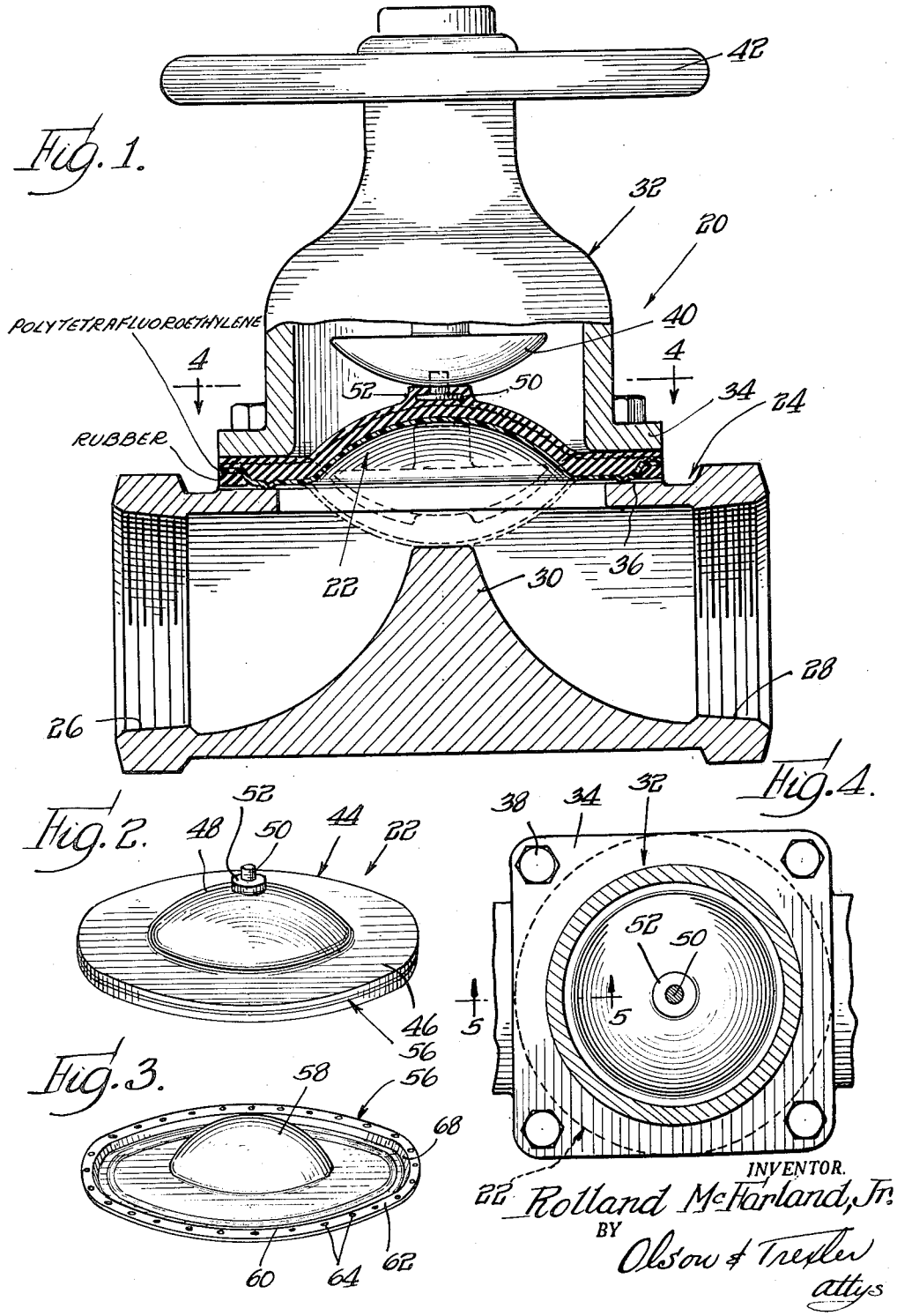

Dec. 22, 1959 — R. McFARLAND, JR — 2,918,089
DIAPHRAGM ASSEMBLY
Filed Nov. 3, 1955 — 3 Sheets-Sheet 3
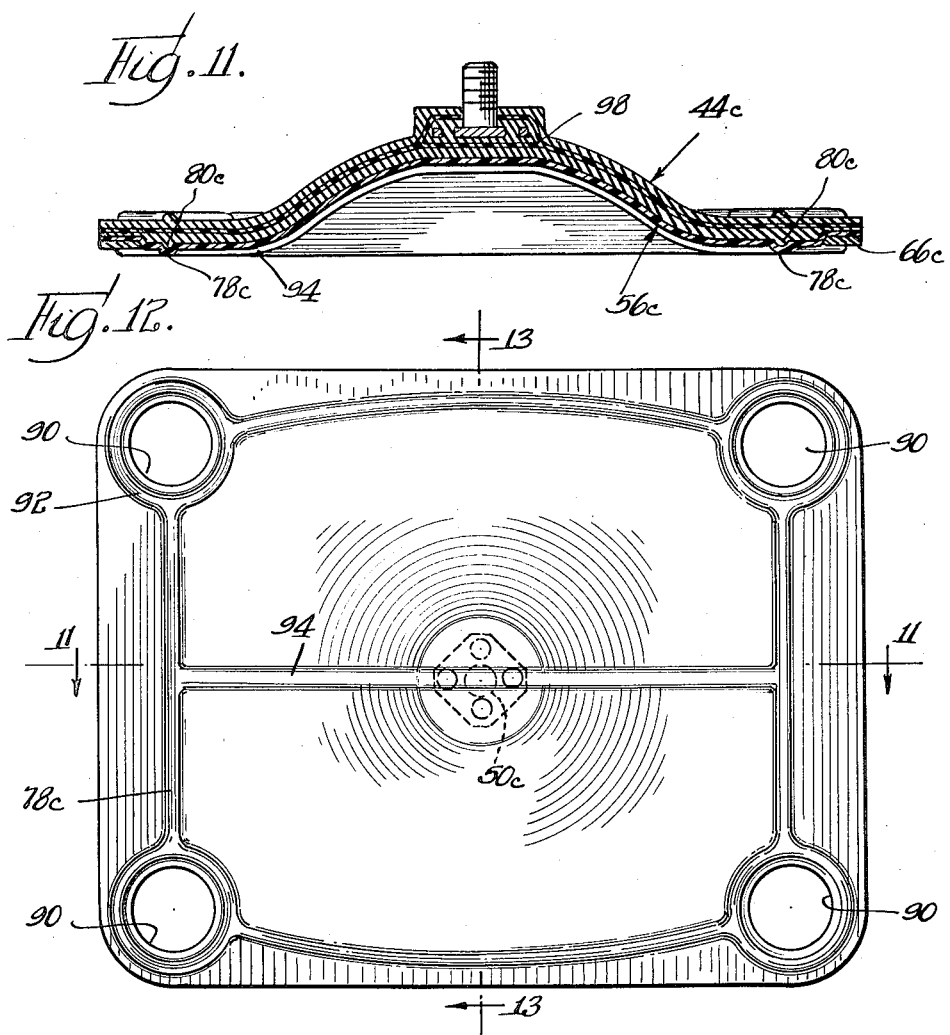
INVENTOR.
Rolland McFarland, Jr.
BY Olson & Trexler
Attys.

United States Patent Office 2,918,089
Patented Dec. 22, 1959

2,918,089

DIAPHRAGM ASSEMBLY

Rolland McFarland, Jr., Crystal Lake, Ill., assignor to Hills-McCanna Company, Chicago, Ill., a corporation of Illinois Application November 3, 1955, Serial No. 544,752

10 Claims. (Cl. 137—793)

The present invention relates to a novel diaphragm structure, and more particularly to a novel diaphragm structure of the general type used in diaphragm valves.

It has heretofore been a general practice to provide valve diaphragms with a facing or liner resistive to particular fluids to be transmitted through the valves. More specifically, it has been proposed to line diaphragms formed from rubber or rubber-like material with a liner of plastic sheet material. Heretofore the conventional way of securing the rubber diaphragm and liner together is merely to clamp them at their peripheries between a valve body and a bonnet flange. While such prior diaphragm assemblies function generally in a satisfactory manner, handling and assembling problems are encountered since the rubber or rubber-like diaphragm and liner are separate from each other. Furthermore, when the diaphragm and liner member are assembled in a valve structure in accordance with prior conventional procedures, an air space is usually left therebetween so that the liner does not always follow the diaphragm during operation of the valve, particularly when the valve is installed in a vacuum system. It is, therefore, an important object of the present invention to provide a novel diaphragm structure wherein a main diaphragm body formed of rubber or any other suitable material and a liner member are permanently interconnected in a simple and economical manner to provide a preassembled unit and substantially to eliminate any space between the diaphragm body member and the liner member so that the liner member will always follow or conform to the diaphragm body member.

Liner members may be formed from various materials which are selected in accordance with the fluid which the liner member is to resist, one of which materials may be polymerized tetrafluoroethylene commercially available under the name of "Teflon." One of the properties of Teflon is that it will not readily adhere to any other material, and, therefore, it is a more specific object of the present invention to provide a novel diaphragm assembly including a flexible body member and a liner of Teflon or any other material having a characteristic similar to the one mentioned above, in which diaphragm assembly, a body member and liner are permanently mechanically interconnected in a simple and economical manner.

A further object of the present invention is to provide a novel preassembled diaphragm unit of the above described type which is constructed so as substantially to preclude the leakage of air or the like between central portions of the body member and the liner member so that the liner member always tends to conform to the body member during operation or flexing thereof.

Other objects and advantages of the present invention will become apparent from the following description and the accompanying drawings wherein:

Fig. 1 is an elevational view partially broken away showing a valve structure incorporating the novel diaphragm assembly of the present invention;

Fig. 2 is a perspective view showing the novel diaphragm assembly of the present invention;

Fig. 3 is a perspective view showing the novel liner member of the present invention;

Fig. 4 is a fragmentary sectional view taken along line 4—4 in Fig. 1;

Fig. 5 is an enlarged fragmentary sectional view taken along line 5—5 in Fig. 4;

Fig. 6 is a fragmentary sectional view taken along line 6—6 in Fig. 5;

Fig. 7 is a fragmentary sectional view similar to Fig. 5 but showing a modified form of the present invention;

Fig. 8 is a fragmentary sectional view similar to Fig. 5 but showing a diaphragm assembly embodying another modified form of the present invention in position to be clamped between a valve body and a valve bonnet;

Fig. 9 is a fragmentary sectional view taken along line 9—9 in Fig. 8;

Fig. 10 is a fragmentary sectional view similar to Fig. 8 but showing the diaphragm assembly fully clamped between the valve body and valve bonnet;

Fig. 11 is a cross sectional view of another embodiment taken along line 11—11 in Fig. 12;

Fig. 12 is a bottom plan view of a modified diaphragm; and

Fig. 13 is a sectional view taken along line 13—13 in Fig. 12.

Referring now more specifically to the drawings wherein like parts are designated by the same numerals throughout the various figures, a valve structure 20 including a diaphragm assembly or unit 22 incorporating the features of the present invention is shown in Figs. 1 and 4. The valve structure includes a body member 24 having an inlet 26 and an outlet 28. A weir 30 traverses the body member for cooperating with the diaphragm assembly to control fluid flow through the valve structure. A bonnet 32 having a flange 34 is disposed on the valve body, and a peripheral portion of the diaphragm unit or assembly is clamped between the bonnet flange and a seat or surface 36 on the valve body. A plurality of bolts 38 or the like extend through the bonnet flange and are threaded into suitable apertures in the valve body for drawing the bonnet flange and the peripheral portion of the diaphragm assembly toward the valve body. A diaphragm compressor 40 is shiftably disposed within the bonnet for actuating the diaphragm assembly or unit 22, and the compressor is operated by any known means, which, for example, may include a handwheel 42.

The diaphragm assembly or unit 22 comprises a relatively thick main body member 44 which is formed from a flexible rubber or rubber-like material or any other suitable material. Preferably, the body member has a generally flat annular peripheral section 46 adapted to project beneath the bonnet flange and a central section 48 which is molded or otherwise formed so as to have a dome shape whereby it will tend to follow the compressor 40 when the compressor is moved to the raised position shown in Fig. 1. A headed screw 50 is embedded in a centrally located enlarged boss 52 on the body member 44 which screw is adapted to be threaded into an aperture in the compressor 40 so that the diaphragm is positively connected to the compressor. Preferably, the rubber or rubber-like body member 44 has a fabric sheet 54 embedded therein so as to prevent undue stretching or tearing thereof.

In order to protect the diaphragm body member 44 from the fluid passing through the valve body, a liner member 56 is disposed against the inner side of the body 44. The liner member which is relatively thin or sheet-like so as to have the desired flexibility may be formed from any suitable plastic material which is inert with respect to the particular fluid to be passed through the valve, and more particularly, the liner may be formed from polymerized tetrafluoroethylene. The liner member is molded or otherwise preformed to provide a central dome-shaped section 58 closely conforming to the inner surface of the body member dome-shaped section and a radially extending section 60 for underlying the peripheral portion 46 of the body member 44. A peripheral portion 62 of the liner member is embedded in the body member 44, and this peripheral portion is provided with a plurality of circumferentially spaced apertures 64. Portions 66 of the body member extend through the apertures 64 and engage the surfaces or walls of the apertures for positively mechanically interconnecting the body member 44 and the liner member. Preferably, a section 68 of the liner member annular portion extends generally axially from the liner portion 60 so as to locate the perforated peripheral liner portion generally mid-way between opposite sides of the body member 44. The section 68 in addition to the apertures provides a generally radially inwardly facing surface interengageable with the body member 44 for preventing the peripheral portion of the liner member from being pulled radially inwardly with respect to the peripheral portion of the body member 44. In the production of the diaphragm assembly, the body member 44 is preferably molded against the preformed liner member so that the inner surface or side of the body member 44 is in intimate contact with the liner member and so that opposite surfaces of a slit in the body member provided by the diaphragm portions 62 and 68 are in intimate contact with the liner member. Thus, there is no air space between the liner member and the body member whereby the liner member tends to remain in conformity with the body member during flexing of the disphragm assembly since any force tending to pull the liner member away from the body member will be resisted by a vacuum which will be created between the members. It should be noted that the body member portions 66 integrally connect portions 70 and 72 of the body member at opposite sides of the slit provided in the body member by the perforated peripheral portion of the liner member and maintain the portions 70 and 72 in intimate contact with opposite surfaces of the peripheral liner member portion so as to restrain the entry of air and the like between the central sections of the body member and liner member. In certain installations such as where the valve structure is inserted in a vacuum line, it may be desirable to apply a resilient adhesive material such as Glyptal which is a polymer of glyceryl phthalate circumferentially around the diaphragm assembly at areas indicated by the numerals 74 and 76 where the surface of the body member 44 is interrupted by the liner member. The adhesive applied in this manner functions further to restrain leakage of air or the like between the body member 44 and the liner member.

The liner member 56 and body member are provided with mating annular protuberances or beads 78 and 80 respectively which are disposed radially inwardly from the peripheral portion 62 and which project axially from the diaphragm assembly. When the diaphragm assembly is clamped between the valve body and the bonnet, the beads or protuberances serve to localize the clamping pressure between the diaphragm body member 44 and the liner member along a narrow annular area so that a further annular seal between the body member and the liner member is provided for even further restraining the leakage of air or the like between the central sections of the members. The annular protuberances or beads also serve to space the liner member section 60 from the surface 36 of the valve body member so that the liner member cannot be bent around relatively sharp edges of the valve body member during flexing of the diaphragm assembly. As a result, during flexing of the diaphragm, the liner member will bend gradually rather than sharply and the useful life thereof will be materially increased.

Fig. 7 shows a slightly modified form of the present invention which is similar to the above described structure as indicated by the application of identical reference numerals with the suffix "a" added to corresponding elements. This embodiment differs only in that the section 72a of the diaphragm body member 44a has been thickened so that it normally extends axially beyond the bead or protuberance 78a. Thus, when the diaphragm assembly is clamped between the valve body and the bonnet the sections 70a and 72a of the body member 44a are compressed and aggressively clamped against opposite surfaces of the liner member peripheral section 62a to increase the area of sealing contact between the body member 44a and liner member whereby even further to restrain the leakage of air therebetween.

Figs. 8, 9 and 10 show another modified form of the present invention which is similar to the above described structure as indicated by the application of identical reference numerals with the suffix "b" added to corresponding elements. This embodiment differs in that the peripheral portions 62b of the liner member terminates short of the peripheral edge of the body member 44a so that an uninterrupted edge portion 82 of the body member traverses the edge of the liner member and thereby precludes the leakage of air or the like between the diaphragm body member and the peripheral portion 62b of the liner member. Thus, the only possible entrance for air between the members is at 76b which area is substantially sealed from the surrounding atmosphere by engagement of the diaphragm body section 72b with the valve body member and is also substantially sealed from the interior of the valve by engagement of the annular protuberance 78b with the valve body member. In addition, a flexible adhesive or cement may be applied to the area 76b, if desired.

Figs. 11, 12 and 13 show a further modified form of the present invention which is similar to the above described structures as indicated by the application of identical reference numerals with the suffix "c" added to corresponding elements. In this embodiment, the diaphragm body member 44c and the liner member 56c have a generally rectangular outline and are provided with apertures 90 for receiving clamping bolts or the like. The peripheral protuberances 78c and 80c extend between the apertures 90 and integrally join with similar protuberance means encircling each of the apertures 90, of which similar protuberance means only the protuberance 92 of the liner member is visible in the drawings. Preferably, another protuberance or bead 94 is provided in the liner member and a mating bead is provided in the diaphragm body member, which additional beads extend along a center line of the diaphragm as shown in the drawings so that they are disposed for cooperating with the weir of a valve structure, as will be understood. If desired, the diaphragm body member may be provided with a continuous bead 96 on its outer face, which bead extends circumferentially around the diaphragm and around the openings 90 for sealing purposes. As shown in Figs. 11 and 13, the reinforcing fabric 54c embedded in the body member extends over the head of the stud member 50c, and preferably, another piece of reinforcing fabric 98 is embedded in the body member beneath the head of the stud member. While the peripheral portion of the liner member 56c is shown embedded in and sealed with respect to the peripheral portion of the diaphragm body member in a manner similar to that shown best in Fig. 5, it will be appreciated that the liner member 56c and the peripheral portion of the diaphragm body member 44c may be interconnected and sealed in the manner shown best in Figs. 7 or 8.

From the above description it is seen that the present invention has provided a novel diaphragm assembly wherein a flexible main body member and a liner member are mechanically interconnected in a secure yet simple and economical manner. Furthermore, it is seen that the diaphragm body member and liner member are interconnected in a manner so that an annular seal is provided between peripheral portions thereof whereby to prevent leakage of air or the like between central portions thereof so that the liner member always tends to remain in intimate contact with the body member.

While the preferred embodiments of the present invention have been shown and described herein, it is obvious that many structural details may be changed without departing from the spirit and scope of the appended claims.

The invention is claimed as follows:

1. A diaphragm assembly comprising a main body member of flexible material including a middle dome-shaped portion and an outer flat portion formed with a slit which opens at one axially facing side of said flat portion completely therearound and extending outwardly toward the cylindrical edge face of said body member, the opposed internal surfaces of said slit being interconnected by spaced columnar members, said assembly further comprising a flexible protective liner disposed at that side of said body member at which said slit opens and having a peripheral portion seated in said slit and apertured to admit therethrough said columnar members.

2. A diaphragm assembly according to claim 1 in which said outwardly extending slit opens at the cylindrical edge face of said body member and the peripheral portion of said liner extends to said cylindrical edge face.

3. A diaphragm assembly according to claim 1 further comprising adhesive material disposed in said slit opening.

4. A diaphragm assembly according to claim 1 in which the peripheral flat portion of said body member is formed with a bead disposed radially inwardly the opening of said slit, said liner being offset to form a groove receiving said bead and to define a second bead axially superposed on said first mentioned bead.

5. A diaphragm assembly according to claim 4 in which said linear bead projects axially beyond the flat peripheral body member portion radially outside said bead.

6. A diaphragm assembly according to claim 4 in which said liner bead projects axially short of the axial projection of the flat peripheral body member portion radially outside said bead 7. A diaphragm assembly as set forth in claim 1 wherein the flexible protective liner is made of polytetrafluoroethylene.

8. A diaphragm assembly as set forth in claim 7 wherein the body member is made of rubber.

9. A diaphragm assembly as set forth in claim 4 wherein the flexible protective liner is made of polytetrafluoroethylene.

10. A diaphragm assembly as set forth in claim 9 wherein the body member is made of rubber.

References Cited in the file of this patent

UNITED STATES PATENTS

| | | |
|---|---|---|
| 1,146,622 | Hill | July 13, 1915 |
| 2,203,859 | Brendlin | June 11, 1940 |
| 2,270,259 | Burke | Jan. 20, 1942 |
| 2,615,471 | McFarland | Oct. 28, 1952 |
| 2,633,155 | Wallerstein | Mar. 31, 1953 |
| 2,710,629 | Price | June 14, 1955 |
| 2,716,017 | Linker | Aug. 23, 1955 |
| 2,787,681 | Roeser | Apr. 2, 1957 |

FOREIGN PATENTS

| | | |
|---|---|---|
| 434,665 | Great Britain | Sept. 6, 1935 |
| 720,836 | Great Britain | Dec. 29, 1954 |

UNITED STATES PATENT OFFICE

CERTIFICATE OF CORRECTION

Patent No. 2,918,089                      December 22, 1959

Rolland McFarland, Jr.

It is hereby certified that error appears in the printed specification of the above numbered patent requiring correction and that the said Letters Patent should read as corrected below.

Column 6, line 4, for "linear bead" read -- liner bead --.

Signed and sealed this 28th day of June 1960.

(SEAL)
Attest:
KARL H. AXLINE
Attesting Officer

ROBERT C. WATSON
Commissioner of Patents